United States Patent
Williams

(10) Patent No.: US 6,695,295 B2
(45) Date of Patent: Feb. 24, 2004

(54) VIBRATION-ISOLATING DEVICE

(75) Inventor: Michael Burns Williams, Lake Oswego, OR (US)

(73) Assignee: R.M. Wade & Co., Tualatin, OR (US)

( * ) Notice: Subject to any disclaimer, the term of this patent is extended or adjusted under 35 U.S.C. 154(b) by 0 days.

(21) Appl. No.: 10/187,583

(22) Filed: Jul. 1, 2002

(65) Prior Publication Data

US 2003/0030201 A1 Feb. 13, 2003

Related U.S. Application Data

(63) Continuation-in-part of application No. 10/010,006, filed on Nov. 9, 2001, now abandoned.
(60) Provisional application No. 60/249,102, filed on Nov. 15, 2000.

(51) Int. Cl.$^7$ ................................................. F16F 13/00
(52) U.S. Cl. .................................................. 267/140.13
(58) Field of Search ....................... 267/140.11, 140.13, 267/152, 153

(56) References Cited

U.S. PATENT DOCUMENTS 5,295,671 A    3/1994   Nakagaki et al.
5,971,376 A   10/1999   Mori et al.
6,341,766 B1   1/2002   Stiller et al.

OTHER PUBLICATIONS

*Declaration of Michael B. Williams Filed Under 37 C.F.R. § 1.56, 1.97 and 1.98* with attached Exhibit A dated Mar. 22, 2002 from patent application Ser. No. 10/010,006 filed Nov. 9, 2001.

Primary Examiner—Christopher P. Schwartz
(74) Attorney, Agent, or Firm—Kolisch Hartwell, P.C.

(57) ABSTRACT

A vibration-isolating device for mounting and/or supporting an apparatus in vibrational insulation from adjacent structures, and a method for fabricating the vibration-isolating device. The vibration-isolating device includes a housing with a side wall portion joined to an end cap. A cushion is disposed on an inner surface of the side wall portion. The cushion is at least partially spaced from the end cap to form an interior compartment. A displaceable member is affixed to the cushion, extending away from the end cap. The displaceable member moves relative to the housing to dampen vibrations or sudden forces exerted on either the member or the housing.

26 Claims, 6 Drawing Sheets

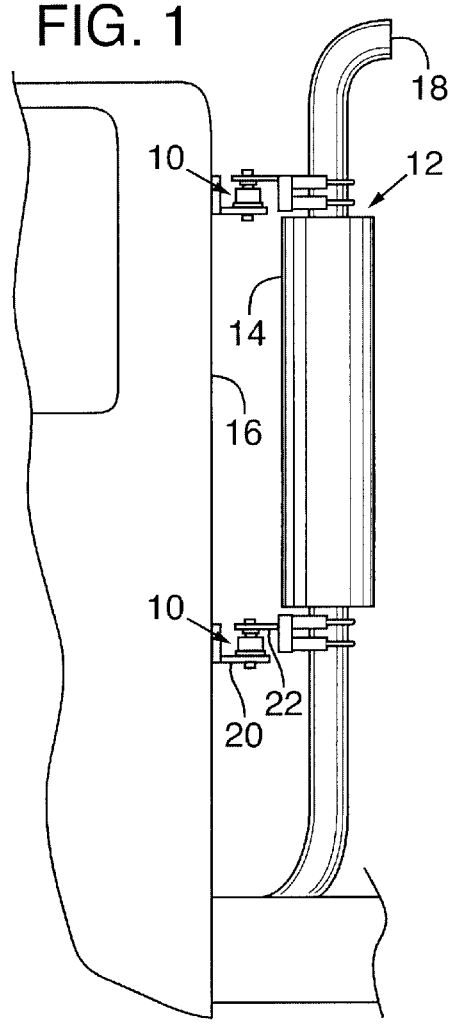
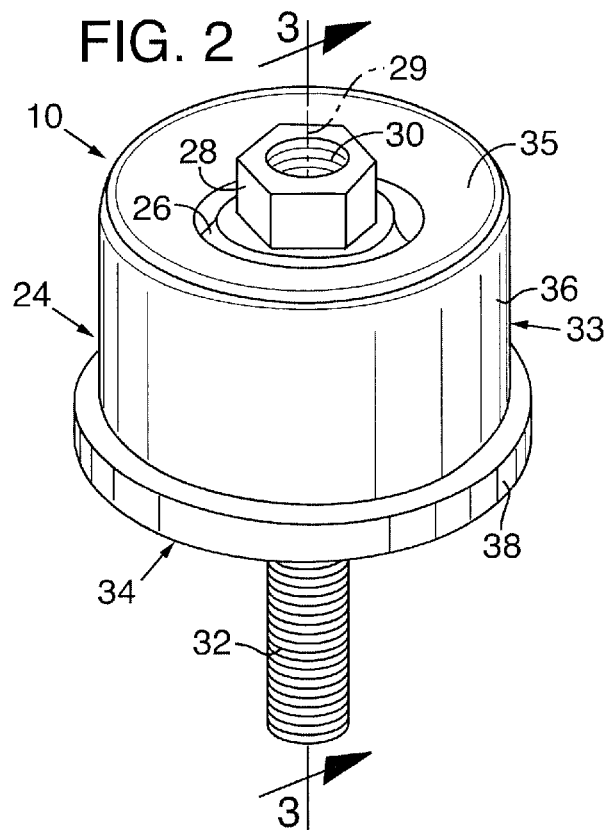
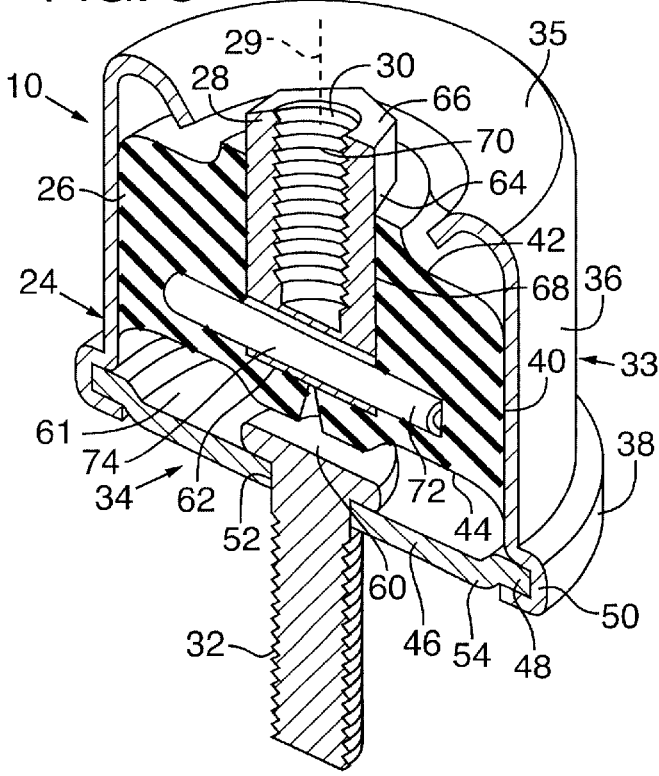

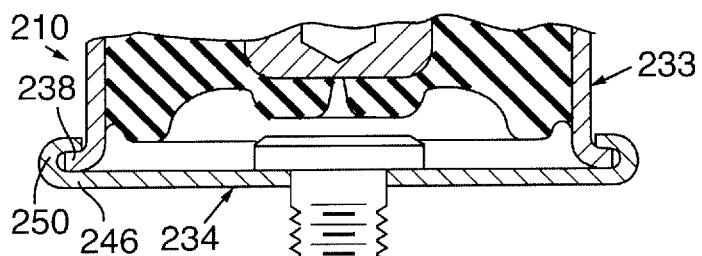
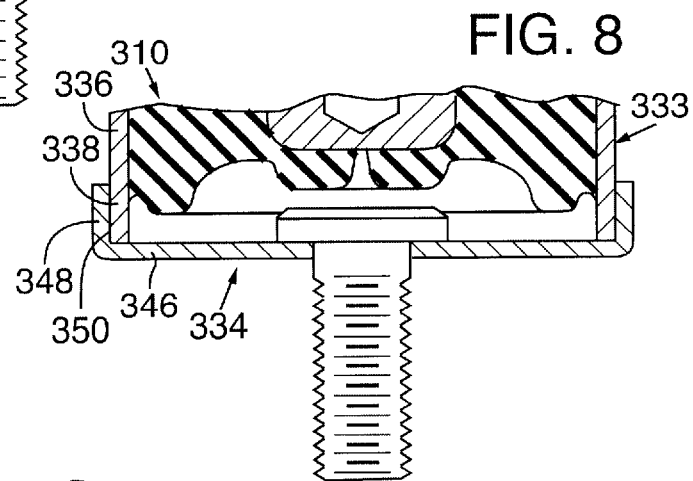
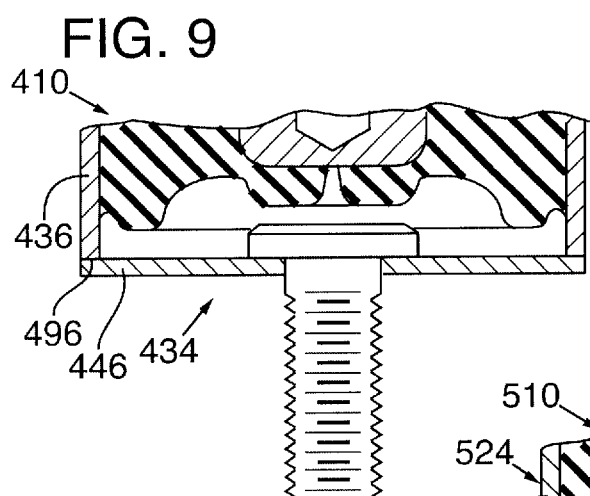
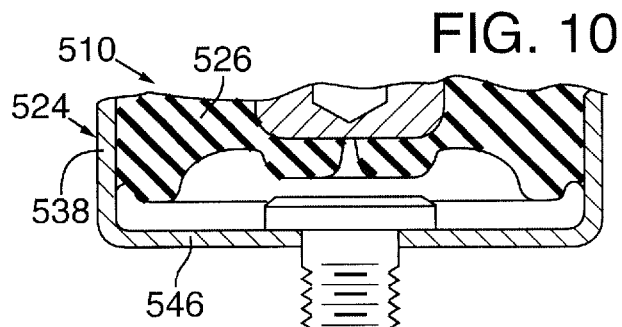
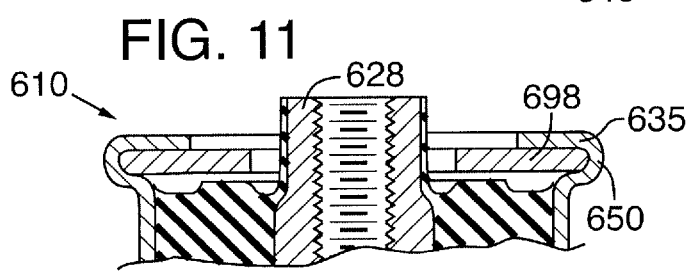

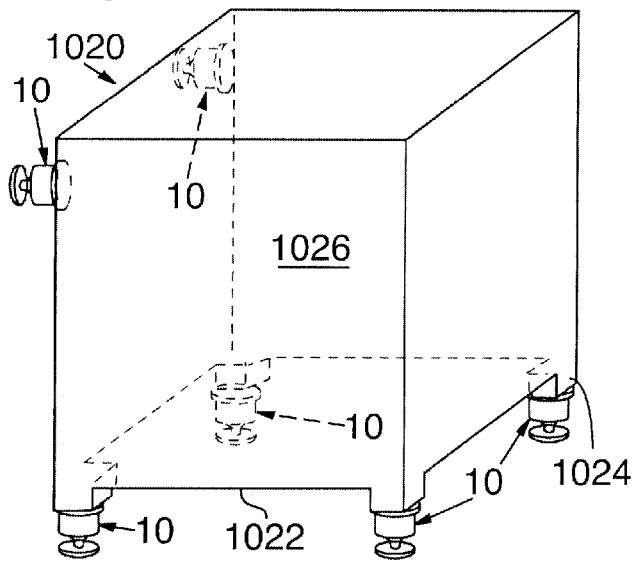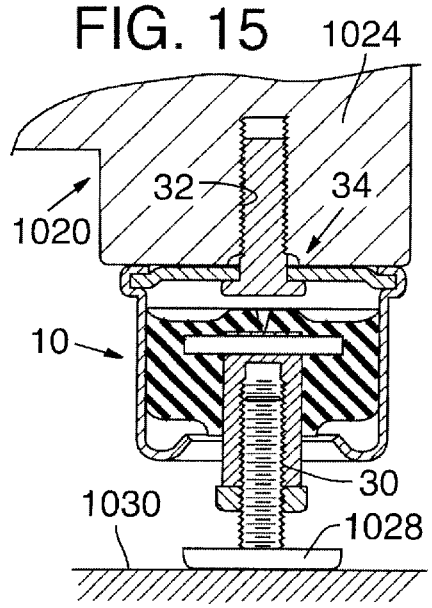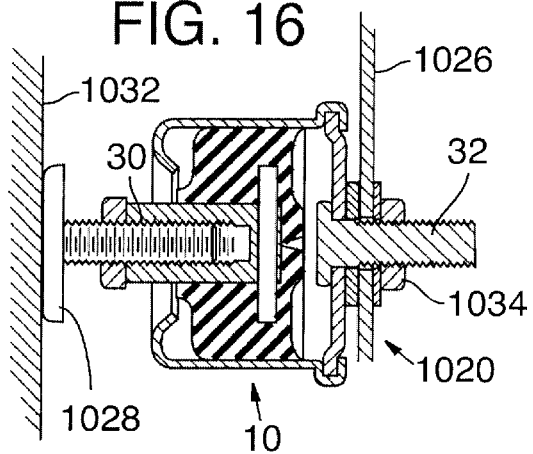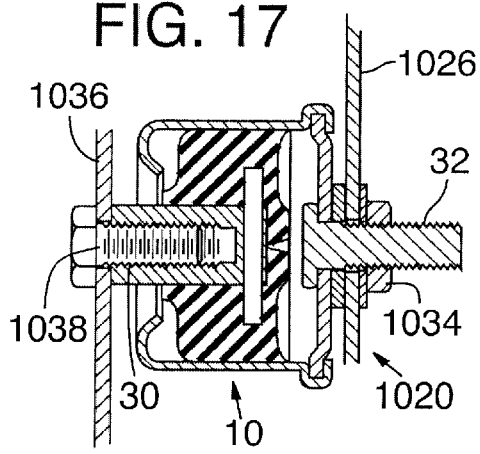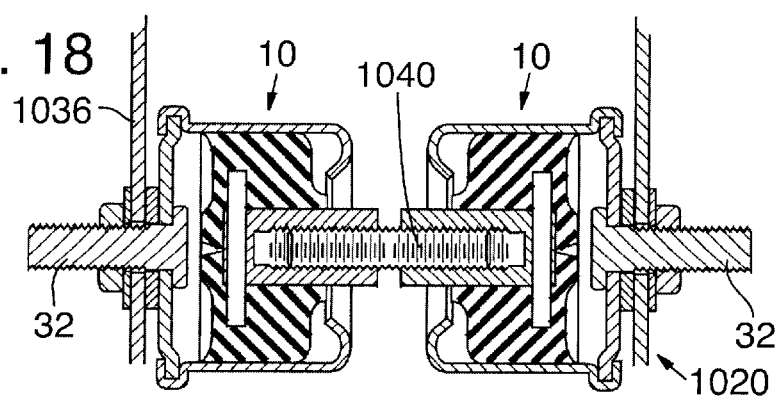

VIBRATION-ISOLATING DEVICE

CROSS-REFERENCES

This application is a continuation-in-part of U.S. Patent Application Serial No. 10/010,006, filed Nov. 9, 2001 now abandoned, which is based upon and claims priority from U.S. Provisional Patent Application No. 60/249,102, filed Nov. 15, 2000, and now abandoned. This application is also based on and claims priority from PCT Application Serial No. PCT/US02/14950, filed May 9, 2002. Each of these applications is incorporated herein by reference.

FIELD OF THE INVENTION

The invention relates to devices for mounting and/or supporting an apparatus in vibrational insulation from adjacent structures upon which the apparatus is mounted and/or supported.

BACKGROUND OF THE INVENTION

Vibrations or sudden motions occur in many settings. In general, any reciprocating or rotating component of an apparatus may set up internal vibrational motion that can damage the apparatus itself or structures that the apparatus contacts or is mounted upon. Vibrations also may originate external to the apparatus. For example, seismic disturbances may damage sensitive devices or items that are mounted upon a frame or rack, supported by a floor, or mounted on the wall or ceiling of a building. Accordingly, effective vibration-isolating devices are important to minimize damage from these internally or externally generated vibrations or motions.

An exemplary site of vibration is an exhaust system of a large truck. The exhaust system generally includes a muffler to reduce noise for both the driver and the community. However, the large size of an efficient muffler, along with the large diameter of exhaust pipes found on heavy trucks, provide a very heavy exhaust assembly to be mounted on the truck. Brackets strong enough to stably attach the exhaust assembly to the truck cab are available, but they create tension between the exhaust assembly and the truck cab. Specifically, the exhaust assembly is attached to the engine, so that engine vibration relative to the cab tends to jar the exhaust assembly loose and damage it structurally. Furthermore, this vibration is transferred to the truck cab, creating a noisier, less relaxing atmosphere for the driver. Therefore, a device is needed to absorb this vibration.

Devices are available that absorb and isolate vibrations. For example, one device that attempts to dampen vibration of an exhaust assembly relies on the compressibility of rubber. This device sandwiches a compressible rubber body between brackets mounted on the truck cab and the exhaust assembly. However, the inability of the rubber body to deform significantly in this device prevents effective isolation of the exhaust assembly relative to the cab. Other devices include additional structural components to mount a rubber body in contact with a fluid layer. As the rubber body compresses or deforms, it pushes fluid from the fluid layer through one or more orifices to absorb vibrations or shocks. These other devices are more complicated to manufacture, generally relying on preformed housing components to hold the rubber body. As a result, at least one additional housing component is required to generally enclose the rubber body.

Therefore, vibration isolating devices are needed that are relatively simple to manufacture through use of a small number of component parts. Similarly, methods are needed to enable manufacture of such devices.

SUMMARY OF THE INVENTION

The invention provides a vibration-isolating device for mounting and/or supporting an apparatus in vibrational insulation from adjacent structures, and a method for fabricating the vibration-isolating device. The vibration-isolating device includes a housing with a side wall portion joined to an end cap. A cushion is disposed on an inner surface of the side wall portion. The cushion is at least partially spaced from the end cap to form an interior compartment. A displaceable member is affixed to the cushion, extending away from the end cap. The displaceable member moves relative to the housing to dampen vibrations or sudden forces exerted on either the member or the housing.

BRIEF DESCRIPTION OF THE DRAWINGS

FIG. 1 is a side elevation, environmental view of two vibration-isolating devices connecting an exhaust assembly to a vehicle cab, in accordance with aspects of the invention.

FIG. 2 is an isometric view of one of the vibration-isolating devices of FIG. 1, in accordance with aspects of the invention.

FIG. 3 is a sectional isometric view of the vibration-isolating device of FIG. 2, viewed generally along 3—3 of FIG. 2, in accordance with aspects of the invention.

FIG. 7 is a partially cross-sectional, fragmentary side view of another embodiment of a vibration-isolating device, showing an alternative approach to attachment of an end cap, in accordance with aspects of the invention.

FIG. 8 is a partially cross-sectional, fragmentary side view of yet another embodiment of a vibration-isolating device, showing yet another approach to attachment of an end cap, in accordance with aspects of the invention.

FIG. 9 is a partially cross-sectional, fragmentary side view of still another embodiment of a vibration-isolating device, showing another alternative approach to attachment of an end cap, in accordance with aspects of the invention.

FIG. 10 is a partially cross-sectional, fragmentary side view of yet another embodiment of a vibration-isolating device, showing an end cap formed unitarily with a side wall portion, in accordance with aspects of the invention.

FIG. 11 is a partially cross-sectional, fragmentary side view of still another embodiment of a vibration-isolating device, showing an alternative approach to forming a first end region of the housing, in accordance with aspects of the invention.

FIG. 14 is an isometric view of an apparatus with a plurality of vibration-isolating devices supporting and/or positioning the apparatus, in accordance with aspects of the invention.

FIG. 15 is a cross-sectional view of a bottom corner of the apparatus of FIG. 14, showing one of the vibration-isolating devices supporting the corner of the apparatus above a horizontal surface, in accordance with aspects of the invention.

FIG. 16 is a cross-sectional view of a side portion of the apparatus of FIG. 14, showing one of the vibration-isolating devices positioning a side of the apparatus in a spaced relation with a vertical surface, in accordance with aspects of the invention.

FIG. 17 is a cross-sectional view of a vibration-isolating device attaching the apparatus of FIG. 14 to a structure, in accordance with aspects of the invention.

FIG. 18 is a cross-sectional view of two vibration-isolating devices connected head-to-head and being used to attach the apparatus of FIG. 14 to a structure, in accordance with aspects of the invention.

DETAILED DESCRIPTION

Figure 4:
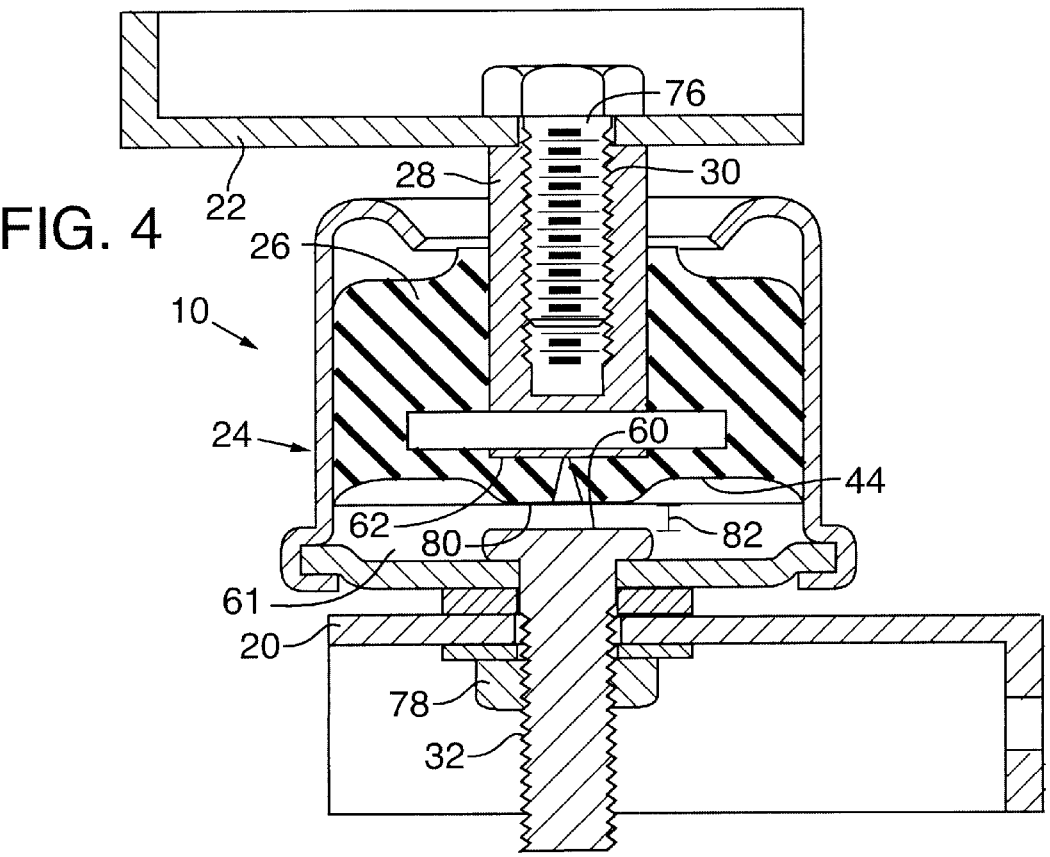
FIG. 4 is a side view in partial cross section of the vibration-isolating device of FIG. 2 in a resting position, connecting an exhaust assembly to a vehicle cab, in accordance with aspects of the invention.

The present invention is directed to a vibration-isolating device, such as the embodiment depicted in FIGS. 1–5 and identified generally with the numeral 10. The depicted device 10 provides a mechanism for coupling first and second structures so that a force exerted on the first structure is dampened and thus transferred less efficiently to the second structure. For example, as shown in FIG. 1, device 10 may be used to isolate movement and vibration of an exhaust system relative to a vehicle cab. In this example, an exhaust assembly 12, including a muffler 14, is attached vertically along the rear of a vehicle cab 16. Exit of exhaust gases occurs at an upper end 18 of exhaust assembly 12, above the cab. A pair of vibration-isolating devices 10 is positioned adjacent assembly 12, with each device connected to vehicle cab 16 and the assembly 12 with bottom and top brackets 20 and 22, respectively. The configuration depicted allows exhaust assembly 12 to be mounted on vehicle cab 16 through vibration-isolating device 10, which generally acts to unlink vibrations and other potentially damaging or irritating movements of exhaust assembly 12 relative to the vehicle cab.

In the example shown, a first end of each vibration-isolating device 10 is connected to exhaust assembly bracket 22, adjacent to muffler 14, and a second end is connected to vehicle cab 16 through vehicle cab bracket 20. However, alternative attachment configurations may be used as well. For example, attachment sites of vibration-isolating device 10 relative to vehicle cab 16 and exhaust assembly 12 may be reversed, that is, the cab may be connected to the first end of the vibration-isolating device, whereas exhaust assembly 12 may be connected to the second end. Furthermore, vibration-isolating device 10 may be inverted relative to the orientation illustrated in FIG. 1, or vibration-isolating device 10 may function in a non-vertical orientation, for example, when an exhaust assembly is mounted horizontally along a bottom region of a truck cab. It will be understood that the exhaust assembly and truck cab are exemplary attachment structures only. Other exemplary uses of the present vibration-isolating devices are described below.

FIGS. 2 and 3 show isometric views of vibration-isolating device 10. A vibration-isolating device generally includes a housing 24, an elastomeric cushion 26 positioned inside housing 24, and displaceable member 28, which is attached to elastomeric cushion 26 and may be substantially aligned with central axis 29. Displaceable member 28 may provide member fastener 30 and housing 24 may provide housing fastener 32. Threaded fasteners 30 and 32 typically extend in generally opposite directions and may be aligned with central axis 29. Fasteners 30 and 32 may be used to attach vibration-isolating device 10 to first and second external structures and thus couple the external structures to each other. In the example of device 10, fastener 30 is female-threaded and fastener 32 is male-threaded. However, in alternative embodiments, the fasteners may have any suitable threaded configurations (such as male/male, female/female, etc.). When the fastener structures are connected to first and second external structures, a force exerted on member 28, such as a force generally downward and parallel to central axis 29, causes member 28 to move relative to housing 24 by structurally altering (deforming) elastomeric cushion 26. Elastomeric cushion 26 thus facilitates isolating or dampening forces exerted on either housing 24 or member 28.

The housing may take a number of different forms. A housing is any structure capable of positioning and holding an elastomeric cushion, at least substantially within an interior space. The housing may fixedly position a peripheral portion of the elastomeric cushion relative to the housing, and may provide a fastener for coupling to an external structure. The housing may include a generally cylindrical region, such as shown in FIGS. 2 and 3. Alternatively, the housing may adopt other cross-sectional geometries, such as oval, or polygonal, or a combination of these geometries. Although a rigid polymeric material may be used, the housing is typically constructed of malleable, non-corrosive, high-strength material, and thus may be formed at least substantially of metal or a metal alloy. A suitable material that has been used successfully is mild steel that is Aluminized, Aluminum Killed, and Deep Draw quality.

As shown in FIGS. 2–5, housing 24 may be generally cup-shaped, defined by a side wall portion 33 and an end cap 34 joined to the side wall portion. The housing may include only a single layer of structural material at housing regions adjacent the cushion (excluding paint or other protective/decorative coatings or layers). Structural material is any material that gives the housing mechanical strength. Alternatively, or in addition, side wall portion 33 and end cap 34 may be formed by separate components, and/or side wall portion 33 may be formed unitarily.

Side wall portion 33 includes a first end region 35, a central region 36, and a second end region 38. The first end region may form an end portion of the housing that is disposed distally to the end cap and may generally converge by extending inward, toward the central axis, as shown for first end region 35 in FIGS. 2 and 3. Alternatively, the first end region may extend parallel to the central region or flare outward. Side wall portion 33 surrounds the central axis, providing an interior space or void in conjunction with end cap 34 (in the absence of the cushion).

Side wall portion 33 also provides an inner surface 40 that may abut and engage elastomeric cushion 26. The inner surface and the first end region may be formed unitarily, that, is as part of a single piece or component. Engagement between the inner surface and the cushion may be through adhesive bonding between surface 40 and cushion 26 or through engaging physical contact. Physical contact may be more effective when the side wall portion includes an irregular inner surface that is engaged by the cushion. For example, the side wall portion may include a dimpled or other uneven surface on at least part of the inner surface. Alternatively or in addition to engagement by central region 36, the first and second end regions of side wall portion 33 may be configured to engage a peripheral region of the elastomeric cushion provided by top surface 42 or bottom surface 44 of cushion 26.

End cap 34 of housing 24 may play at least several roles in vibration-isolating device 10. End cap 34 may include housing fastener 32 for securing device 10 to an external structure. As shown in FIGS. 2–5, housing fastener 32 may be threaded, such as the bolt shown, or a nut. Alternatively, fastener 32 may indirectly function as a fastener by including attachment structure such as a bracket that may be connected through a separate fastener to an external structure.

End cap 34 also at least substantially covers an end of housing 24. End cap 34 may include endplate 46 to carry out this function at least partially. Endplate 46, generally in conjunction with the housing fastener, may at least substantially or completely cover an end of housing 24. In addition, endplate 46 may position housing fastener 32 relative to housing 24. Endplate 46 may be mounted on side wall portion 33 through direct physical engagement with second end region 38. As shown in FIG. 3, a perimeter 48 of the endplate may be gripped by gripping structure 50 of side wall portion 33. For example, gripping structure 50 may grip some or all of perimeter 48 on opposing faces of endplate 46, and may also engage the side edge of the endplate. Gripping structure 50 may be present on either side wall portion 33, end cap 46, or both. Structure 50 generally may include any contact structure on either the side wall portion or end cap (or both) sufficient to stably mount the end cap by physical engagement, typically restricting the ability of end cap 34 to rotate and move axially.

Housing fastener 32 may be mounted on endplate 46. For example, endplate 46 may include a through-hole 52 through which housing fastener 32 extends. Through-hole 52 may define a perimeter that physically engages housing fastener 32. For example, a STRUX clinch stud, obtained from Camcar Textron, has been used successfully as housing fastener 32. This stud may be stably held in position after pressure mounting in through-hole 52 of endplate 46.

The shape and composition of the endplate may be determined by structural and/or functional considerations. Endplate 46 may be generally planar, or assume any other suitable shape that allows the endplate to be mounted on the side wall portion and provide a mounting site for the housing fastener. When generally planar, endplate 46 may also include a central depression, defined by offset 54. Offset 54 may be generally annular, as shown in FIG. 3. Offset 54 is an example of a deformation limiting structure. A deformation limiting structure is any end cap structure that may protect endplate 46 from a tendency to deform in response to a centrally located axial force. Such a force may be produced when fasteners 30 and 32 are secured to external structures, which may tend to buckle endplate 46. The endplate may be produced from a strong, non-corrosive material such as stainless steel or aluminized steel.

End cap 34 may include a displacement limiting structure 60. Displacement limiting structure 60 is any physical barrier that blocks displacement of cushion 26 beyond the barrier. In device 10, displacement limiting structure 60 is provided by the head of housing fastener 32. Alternatively, displacement limiting structure 60 may be distinct from housing fastener 32. For example, the displacement limiting structure may overlie the housing fastener or may be positioned laterally relative to the fastener.

Housing 24 positionally fixes a peripheral portion of elastomeric cushion 26 so that more central portions of the cushion deform. Elastomeric cushion 26 may be constructed from any material that is reversibly deformed in response to transient shear and compression forces. Cushion 26 may be formed of rubber or a similar elastomeric material, for example, using injection into a mold. In some embodiments, rubber may be injected under pressure when the rubber is in a liquid form and subsequently vulcanized to a durable form, as exemplified below.

Cushion 26 is disposed at least substantially within housing 24, but in a spaced relation with end cap 34. The spaced relation produces an interior compartment 61 that generally extends from a bottom surface 44 of the cushion to end cap 34. Interior compartment 61 may be a gas-phase compartment, that is, enclosing gas, typically air at ambient pressure, and not substantial amounts of fluid. The central region may intersect central axis 29 and include structure 60 of fastener 32. In some embodiments, a peripheral region of bottom surface 44, near side wall portion 33, may contact the end cap.

The disposition, shape, and composition of the displaceable member may be determined by structural and/or functional considerations. Displaceable member 28 is affixed to cushion 26, typically by embedding member 28 in the cushion during formation of the cushion. Member 28 may be disposed such that it is substantially coaxial with the housing, aligned with central axis 29, and extending generally toward first end region 35 (and away from the end cap). Suitable materials for member 28 may include high strength materials such as stainless steel and mild steel. Displaceable member 28 may take any form in which a first portion provides a surface that anchors the member to cushion 26 and a second portion provides member fastener 30. Generally, member 28 includes a second end section 62, a side section 64, and a first end section 66. Alternatively, member 28 may be described as including a cushion attachment surface 68 and a fastener portion 70. Attachment surface 68 typically includes a least a part of second end section 62 and side section 64. In the example of FIGS. 2–5, member 28 has an elongate structure with a hexagonal exterior surface. Attachment surface 68 of member 28 is embedded in cushion 26. Attachment surface 68 may also include at least one extension 72 that protrudes outward from side section 64. Extension 72 may be formed unitarily with member 28 or may be provided by a separate structure, such as pin 74, which is inserted through a hole in attachment surface 68 and extends generally orthogonal to central axis 29 of device 10.

Figure 5:
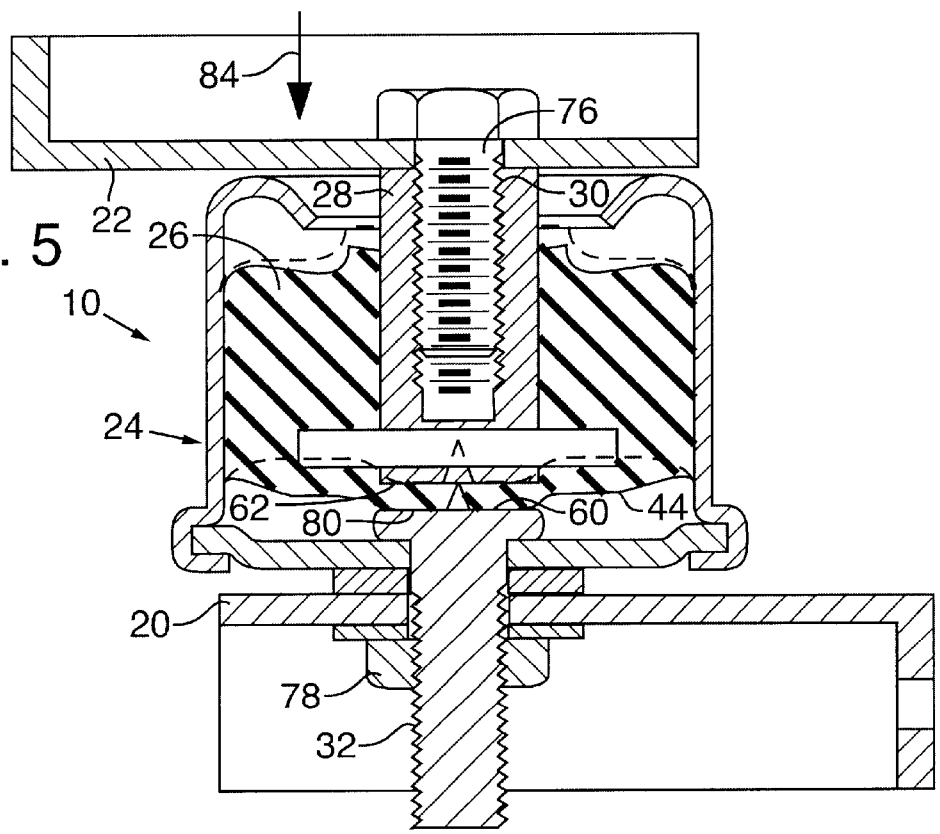
FIG. 5 is a side view in partial cross section of the vibration-isolating device of FIG. 4, responding to a downward force, in accordance with aspects of the invention.

Cushioning action of vibration-isolating device 10 may be understood by comparing FIGS. 4 and 5. In FIG. 4, device 10 is shown in a resting position, mounted between bottom and top brackets 20 and 22. Device 10 is attached to top bracket 22 using member fastener 30, which is connected to bolt 76, and attached to bottom bracket 20 using housing fastener 32 and nut 78. In resting position, a central portion 80 of the cushion's bottom surface 44 is disposed in a spaced, opposing relationship to displacement limiting structure 60. Specifically, region 44 and structure 60 are separated by a limiting distance 82 defined by interior compartment 61.

FIG. 5 illustrates the effect of a downward vertical force 84 (arrow), exerted through bracket 22 to member 28 of device 10. Force 84 displaces member 28 vertically within housing 24, deforming elastomeric cushion 26 downward from its resting position, shown as upper and lower dashed contours. With a sufficient downward force 84, as shown in this example, downward displacement of central portion 80 of cushion 26 is limited by structure 60, usually through direct contact, as shown. Therefore, vertical displacement of member 28 by limiting distance 82 approximately defines the extent of movement of member 28 through which cushion 26 undergoes predominantly shear deformation.

Figure 13:
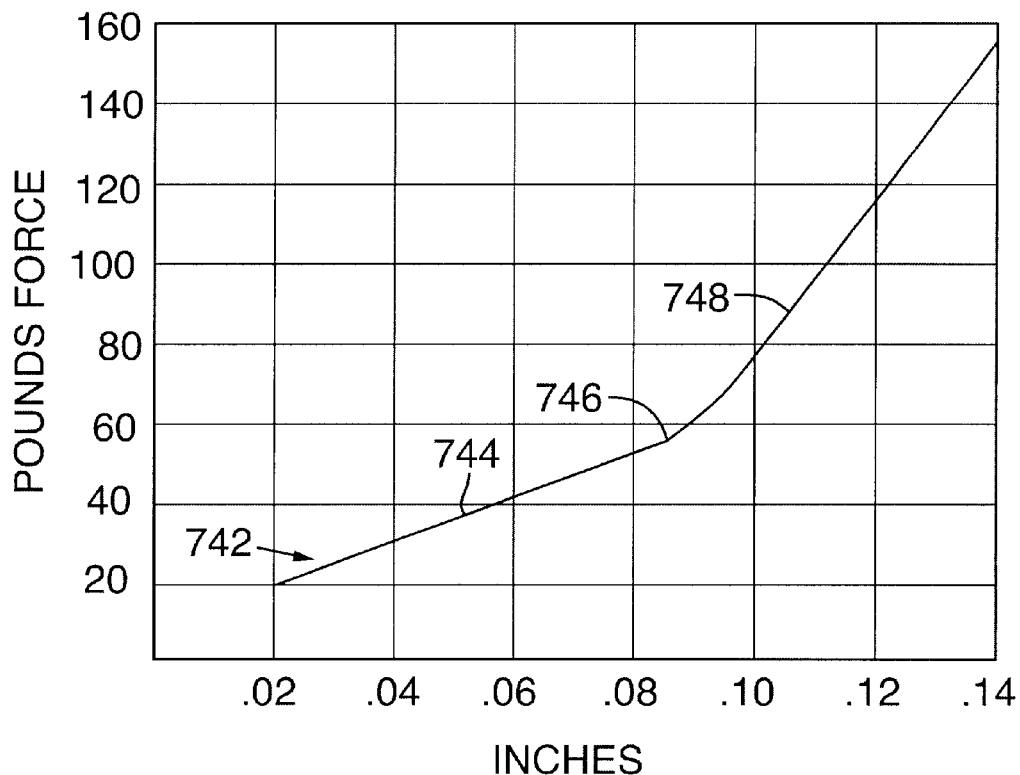
FIG. 13 is a diagram presenting force-displacement values that were produced by a specific embodiment of a vibration-isolating device constructed according to FIG. 6.

Once sufficient force is exerted for displacement of cushion 26 to be limited by structure 60, subsequent downward movement of member 28 mainly requires compression of cushion 26. Specifically, central portion 80 of the cushion is compressed between second end section 62 of member 28 and structure 60. Therefore, the overall result of increasing force may be a biphasic shock absorbing action in which member 28 first moves predominantly by shear deformation of cushion 26, and then predominantly by compression of cushion 26. A specific example of a biphasic curve is presented in FIG. 13 and will be discussed below. It will be understood that forces directed upwardly, laterally, or rotationally on member 28 also may produce significant shock absorption through cushion deformation.

Alternative Embodiment of a Vibration-Isolating Device

Figure 6:
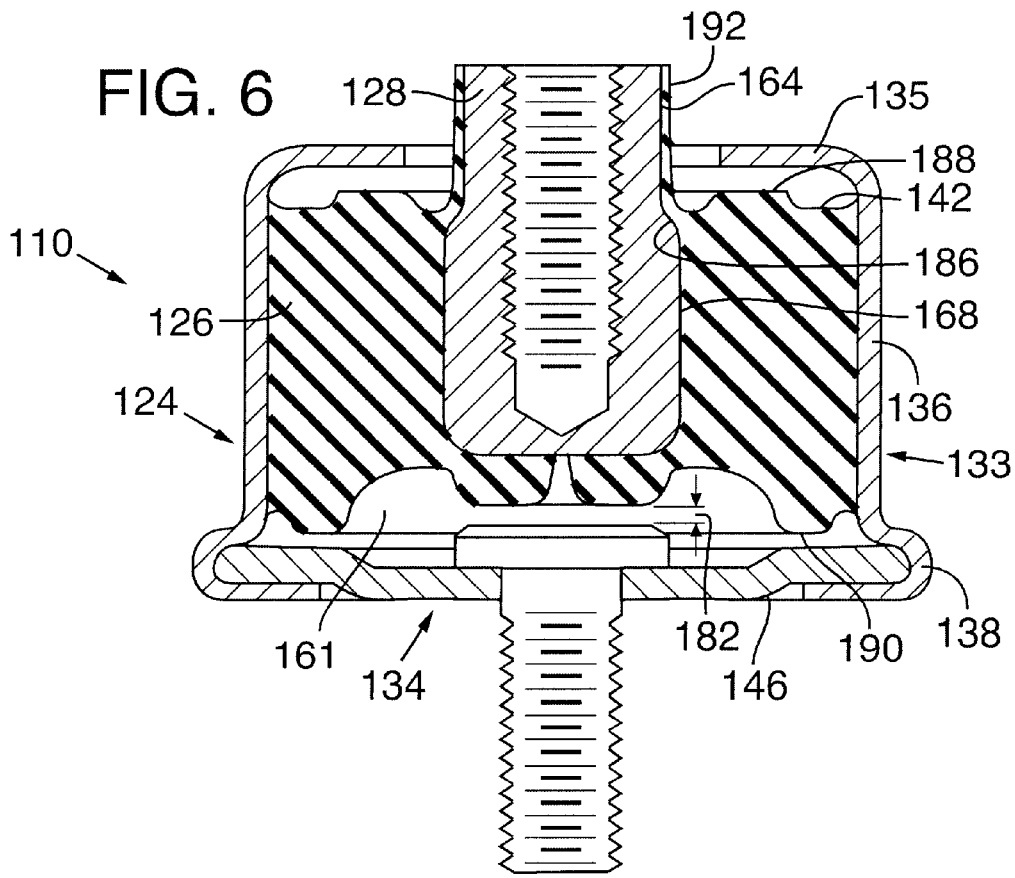
FIG. 6 is a side view in partial cross section of another embodiment of a vibration-isolating device, in accordance with aspects of the invention.

An alternative vibration-isolating device 110 is shown in FIG. 6. Vibration-isolating device 110 includes housing 124, cushion 126, and displaceable member 128. Housing 124 also includes end cap 134 joined to side wall portion 133, the end cap being similar in design to that used in vibration-isolating device 10. However, at least several aspects of vibration-isolating device 110 are distinct from device 10.

Displaceable member 128 has a circular cross-sectional geometry (not shown) and includes a taper along side section 164 of attachment surface 168. Although a "step" taper 186 is shown in this example, a more gradual taper may be used. A taper, extension 72, or any other protruding or irregular structural aspect of the displaceable member that may improve retention in the cushion may be described as a member retention structure.

First end region 135 of housing 124 bends inward from central region 136, but differs from first end region 35 of device 10 by extending in an orthogonal orientation relative to central region 136. First end region is spaced from, and generally opposed to, top surface 142 of cushion 126, forming a generally annular cavity.

Cushion 126 includes cushion-retention structures 188 and 190 that may be spaced closely from first end region 135 and endplate 146, respectively. In this example, the cushion-retention structures are positioned to retain cushion 126 within housing 124, through contact with first end region 135 and endplate 146, if attachment of cushion 126 to central region 136 is compromised. Thus, cushion-retention structures 188 and 190 may function in a fail-safe structure that may allow device 110 to maintain mounting, supporting, and/or partial shock-absorbing abilities under extreme operating conditions. Such extreme operating conditions may cause a peripheral portion of cushion 126 to slip relative to central region 136 of the housing.

Retention structures 188 and 190 also may be involved directly in shock absorption. For example, structure 188 may be spaced from the first end region 135 so that the structure and region are in contact after sufficient upward displacement of member 128. Once in contact, the force-displacement properties of the device will change. Thus, this configuration may produce a biphasic or dual-rate shock absorption at the top of device 110, similar to that produced at the bottom of the device (see FIGS. 4, 5, and 13).

In the example of FIG. 6, first cushion-retention structure 188 is formed as a generally annular protrusion of top surface 142 of cushion 126, although multiple spaced protrusions may be used. In addition, any other configuration may be used for first end surface 142 that spaces the cushion-retention structure at a distance from the first end region of the housing, for example, a distance similar to limiting distance 182. Second cushion-retention structure 190 also may be formed as a generally annular protrusion, multiple spaced protrusions, or any other closely spaced structure that is spaced from endplate 146, generally less than limiting distance 182. Alternatively, each cushion-retention structure may be engaged by a peripheral region of first end region 135 or endplate 146, when the vibration-isolating device is in a resting position, rather than spaced as shown in FIG. 6. In that case, the structures would assist in fixedly positioning a peripheral portion of the cushion, while still allowing more centrally located regions of cushion 126 to be deformed.

Cushion 126 extends upward, shown at 192, to cover, or at least substantially cover, side 164 of member 128. By covering side 164 with cushion 126, member 128 may be protected, for example from corrosion, and may also more efficiently engage cushion 126, due to increased surface engagement area. The cushion may extend over a surface area of the side of the member that is at least equal to a total area of engagement between the central region of the housing and the peripheral region of the cushion.

Examples of Alternative End Caps or First End Structures

FIG. 7 shows vibration-isolating device 210, with an alternative configuration for mounting an end cap 234 on side wall portion 233 of the housing. In device 210, gripping structure 250 is provided by a perimeter region of endplate 246, and grips a flange formed on second end region 238 of the side wall portion.

FIG. 8 shows vibration-isolating device 310, with an attachment strategy for another end cap 334. End cap 334 includes a perimeter 348 that extends orthogonally from a central portion of endplate 346 to produce a gripping structure 350 that engages second end region 338 of side wall portion 333. In some embodiments, structure 350 may use welding or adhesive bonding to promote stable mounting. As an alternative to the perimeter fitting outside of second end region 338, end cap 334 may be dimensioned to allow second end region 338 to tightly fit outside of perimeter 348. In either case, a face of second end region 338 is joined to a face of endplate 346.

FIG. 9 show vibration-isolating device 410, with an alternative mounting strategy for attaching end cap 434. In this embodiment, a face of endplate 446 is joined to lower end 496 of the second end region. End cap 434 may be attached by any suitable approach such as welding or adhesive bonding.

FIG. 10 shows vibration-isolating device 510, with endplate 546 and second end region 538 that are joined by forming them unitarily. In this case, housing 524 may be produced by cold-forming an appropriately dimensioned sheet of metal, or may be molded or cast. Cushion 526 may be molded separately and then press-fit into housing 524.

FIG. 11 shows vibration-isolating device 610, with endplate 698 mounted on first end region 635 and surrounding a portion of displaceable member 628. In this example, gripping structure 650 mounts a perimeter of endplate 698.

Methods of Fabricating a Vibration-Isolating Device

Figure 12A:
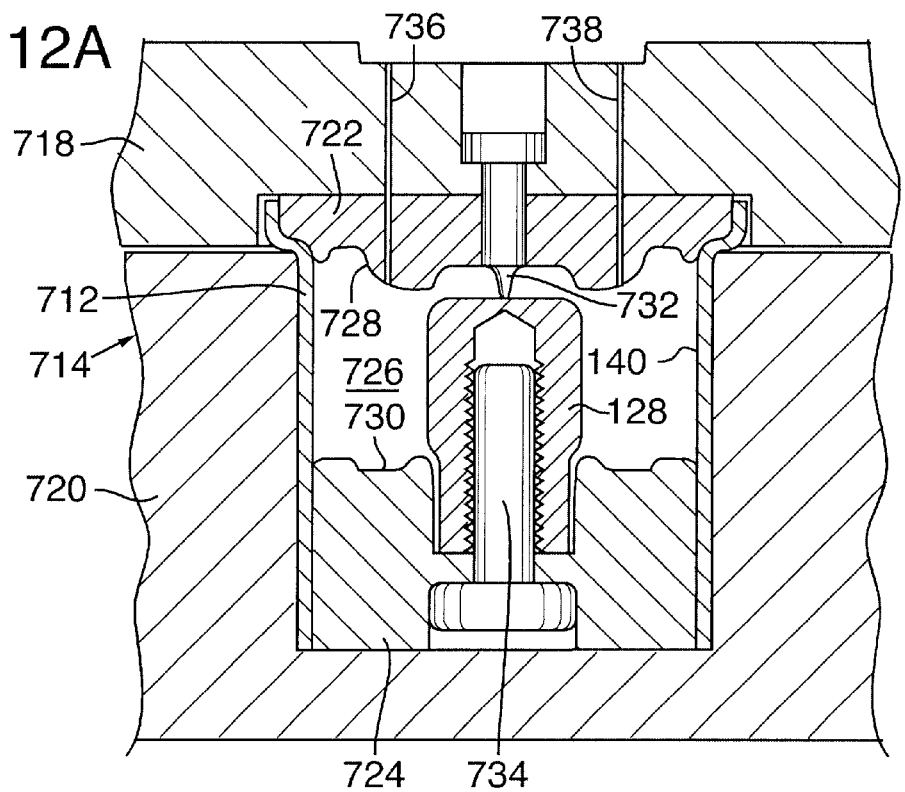
FIGS. 12A, B, and C illustrate a method of fabricating an embodiment of a vibration-isolating device, with each step shown as a side view in partial cross section, in accordance with aspects of the invention.
Figure 12B:
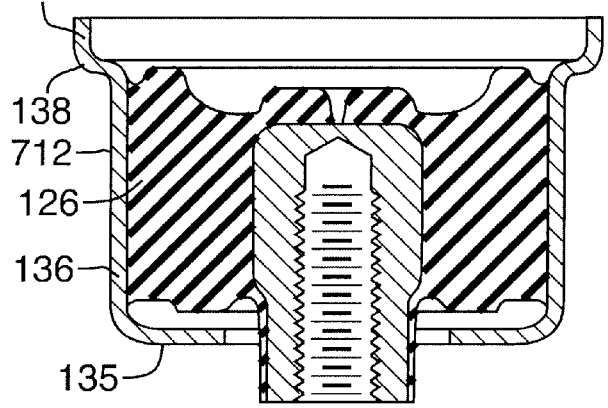
Figure 12C:
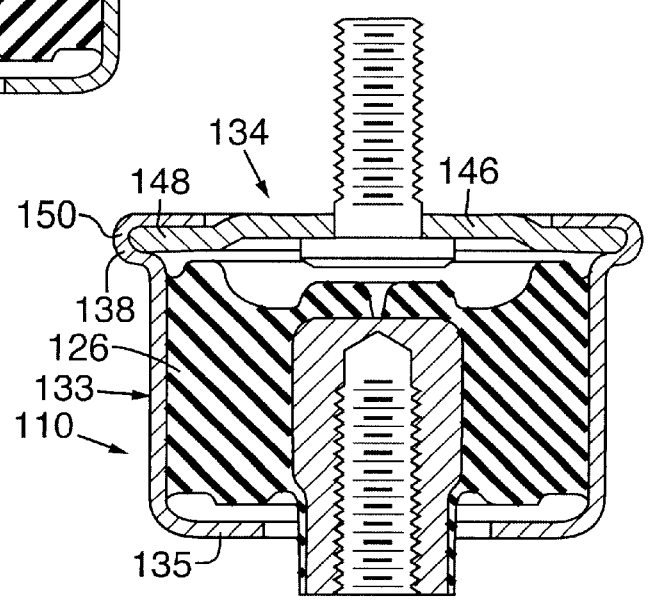

FIGS. 12A–C depict steps that may be carried out in constructing a vibration-isolating device according to the present invention, exemplified here with device 110 of FIG. 6.

FIG. 12A shows side wall portion 712 positioned within mold 714. Side wall portion 712 may be formed unitarily, for example, as a cylinder. In alternatively embodiments, side wall portion 712 may include a partially formed gripping structure 716 at this stage, such as that shown in FIG. 12B. In either case, the shape of side wall portion 712 may modified additionally after mounting a cushion in abutment with inner surface 140, to form final side wall portion 133.

Mold 714 includes blocks 718 and 720 into which first and second forms 722 and 724 may be attached by any suitable mechanism such as screws, bolts, an adhesive, or welding. Alternatively, each half block and form may be formed unitarily. Chamber 726 may be produced by a surface 728 of first form 722, a surface 730 of second form 724, a surface of displaceable member 128, a portion of retainer 732, and inner surface 140 of side wall portion 712. Member 128 may be held in place within chamber 726 by positioner 734 and retainer 732. Molten material may be injected into channel 736 and/or 738 under high pressure. Cushion 126 may be molded in an inverted configuration relative to FIG. 6.

Typically, rubber is used to form cushion 126. With rubber, an elevated temperature of approximately 350° F. and an elevated pressure may be used to facilitate vulcanization of the rubber within the mold and to member 128 and to inner surface 140 of side wall portion 712. In addition, both inner surface 140 of side wall portion 712 and an exterior surface of member 128 may be prepared for rubber bonding. These surfaces may be chemically cleaned, then treated with a primer, such as Chemlock 205, and allowed to dry. Subsequently, the primed surfaces may be coated with a suitable adhesive, such as Chemlock 252, and the adhesive allowed to cure for two or more hours. This preparation may provide surfaces that tightly bond rubber during injection molding and vulcanization.

Subsequent to forming cushion 26, mold 714 may be removed and side wall portion 712 further modified in shape. This shape modification forms final side wall portion 133 and may join end cap 134 to side wall portion 133. For example, a partially-formed gripping structure 716 may be shaped from second end region 138 at this step. Alternatively, or in addition, first end region 135 may be shaped, for example, by circumferentially bending the first end region inward. End cap 134 then may be placed in position and gripping structure 150 completed by shaping (bending) second end region 138 over perimeter 148 of endplate 146.

An alternative method may be used to form a vibration-isolating device in which the side wall portion and endplate are unitary, such as exemplified in vibration-isolating device 510 of FIG. 10. A cushion may be molded around a displaceable member in a fashion similar to the configuration shown in FIG. 12A, but in the absence of a housing. This produces a cushion-member combination. The housing may be formed separately, for example, by cold-forming an appropriately dimensioned sheet of metal or by casting. Subsequently, the cushion-member combination may be press-fit inside the housing. Finally, the first end region of the housing may be formed as described for vibration-isolating device 110 above. The cushion may be adhesively bonded to the inner surface of the housing and/or the first end region or the endplate may be used to hold the cushion in position.

Example of Vibration-Isolating Device Force-Displacement

The following is an example of a force-displacement curve generated with a vibration-isolating device according to the present invention. A vibration-isolating device was constructed according to the embodiment of FIG. 6 with the following general specifications: housing height, 36.9 mm; housing outer diameter, 50.8 mm; displaceable member diameter at first end portion, 15.9 mm; and limiting distance, 2.16 mm or about 0.085 inches. The housing was constructed of 16 gage aluminized steel, with the exception of the endplate, which was formed from 12 gage aluminized steel. The displacement limiting structure/housing fastener 32 was provided by a STRUX clinch stud, ⅜"×1", alloy steel, Grade 8, obtained from Camcar Textron. The cushion was formed of rubber with the following properties: ASTM D200 M4 CA514 B35 Z1 Z2 Z3; where Z1 is 55 durometer +/−5, Z2 is EPDM; and Z3 tension is set per D412 section 12.2 at 250° F., not to exceed 5%.

Displacement of member 128 along the central axis was measured using a varying, axially-aligned force of known magnitude. The biphasic curve 742 shown in FIG. 13 was obtained by plotting these measurements and drawing a continuous, best-fit curve. Curve 742 includes shear phase 744 at displacement of member 128 less than limiting distance 746, and compression phase 748 at displacement of member 128 greater than limiting distance 746, at about 0.085 inches. It will be understood that in vibration-isolating devices described herein, any suitable dimensions may be selected for regions of the devices. For example, a suitable diameter, length, limiting distance, and spacing between the first end of the housing and top surface of the cushion may be selected to produce any desired amount of force dampening.

Exemplary Uses of Vibration-Isolating Devices

This section describes additional exemplary uses for vibration-isolating devices constructed in accordance with the invention; see FIGS. 14–18. A specific embodiment of a vibration-isolating device, device 10, is depicted in FIGS. 14–18. However, any vibration-isolating device described herein may be used alternatively.

FIG. 14 shows an apparatus 1020 being supported and positioned by a plurality of vibration-isolating devices 10. In this example, devices 10 are attached to a bottom end portion 1022, at each corner region 1024, and to a side 1026 of the apparatus. However, one or a plurality of vibration-isolating devices, as described herein, may be attached to any suitable portion of an apparatus, including the bottom, the top, any corners or edges, one or plural sides, and/or interior regions.

Apparatus 1020 generally may include any device, machine, machine component(s), frame, and/or other support structure that either produces vibrations and/or may be beneficially isolated from external vibrations or shocks, including any unexpected or undesired movement, such as collisions or seismic activity. Exemplary apparatus 1020 that produce vibrations may include appliances (such as washing machines, refrigerators, dryers, stoves, microwave ovens, mixers, or heaters, among others), and apparatus with engines or motors (such as automobiles, motorcycles, scooters, generators, power tools, heavy machinery, centrifuges, etc.). Accordingly, various components of these appliances or motorized apparatus may be mounted by, or supported on, vibration isolators described herein (such as radiators, fans, coolers, frames, etc.) Exemplary apparatus that may be beneficially isolated from external vibrations, shocks, or acute motion, such as seismic disturbances, may include any electronic, electromechanical, or optical equipment (for example, digital processing and/or storage devices, audio devices, cameras, electrical breakers, sensors, and/or the like), or any other fragile item(s). Such electronic, electromechanical, or optical equipment, or other fragile items, may be attached directly to one or more vibration-isolating devices, or may be supported by, or attached to, a rack or frame that is attached to one or more of the devices.

FIG. 15 shows a cross-sectional view of one of devices 10 supporting corner region 1024 of apparatus 1020. Fastener 32 threadedly engages corner region 1024 and end cap 34 is in abutment with a bottom surface of corner 1024. Foot 1028 threadedly engages fastener 30 and contacts a generally horizontal surface, such as a floor 1030. As a result, corner region 1024 is supported above floor 1030 in a vibration-isolated mode provided by device 10. Here, device 10 is mounted on corner region 1024 in an inverted position relative to FIGS. 1–5, although in alternative embodiments, the orientation of FIGS. 1–5 may be suitable for supporting corner 1024. For example, fastener 30 may be connected to corner region 1024, and fastener 32 may be connected to foot 1028 or formed to include a foot. Generally horizontal surfaces upon (or under which) vibration-isolating devices may be used may include the ground, a ceiling, a table, a shelf, a rack, a ledge, the top (or underside) of a machine, a horizontal frame portion, or the like.

FIG. 16 shows another mode by which vibration-isolating devices may provide vibration or shock insulation between apparatus 1020 and another structure, such as wall 1032. Here, vibration-isolating device 10 is mounted on side 1026 of apparatus 1020, using threaded engagement between fastener 32 and nut 1034. Foot 1028 is threadedly attached to fastener 30 and extends horizontally to contact wall 1032. Accordingly, device 10 spaces apparatus 1020 from wall 1032 while isolating vibrations or shocks. In alternative configurations, the other structure may be a vertical frame portion, the side of a machine, a tree, and/or the like, and any other suitable region(s) of apparatus 1020 may be used for mounting device 10 (such as the bottom, top, corners, etc.). Furthermore, apparatus 1020 may be attached to another structure using one or plural vibration-isolating devices mounted at any suitable angle.

FIG. 17 shows vibration-isolating device 10 attaching side 1026 of apparatus 1020 to structure 1036. Here, bolt 1038 connects structure 1036 to fastener 30, and nut 1034 connects apparatus 1020 to fastener 32. Structure 1036 may include a frame, a wall, a bracket, another machine component, and/or the like.

FIG. 18 shows a plurality of interconnected vibration-isolating devices 10 attaching apparatus 1020 to another structure 1036. Devices 10 are connected by a threaded shaft 1040, which may allow adjustable spacing between devices 10, and thus between apparatus 1020 and structure 1036. The use of two devices in this head-to-head (or a tail-to-tail) configuration may enhance vibration insulation.

Although the invention has been disclosed in its preferred forms, the specific embodiments thereof as disclosed and illustrated herein are not to be considered in a limiting sense, because numerous variations are possible. The subject matter of the invention includes all novel and non-obvious combinations and subcombinations of the various elements, features, functions, and/or properties disclosed herein. The following claims define certain combinations and subcombinations of features, functions, elements, and/or properties that are regarded as novel and nonobvious. Other combinations and subcombinations may be claimed through amendment of the present claims or presentation of new claims in this or a related application. Such claims, whether they are broader, narrower, equal, or different in scope to any earlier claims, also are regarded as included within the subject matter of the invention.

I claim:

1. A device for dampening vibrations, comprising:
   a housing having a side wall portion and an end cap, the side wall portion being formed unitarily and a component distinct from the end cap, the side wall portion including opposing first and second end regions and having an inner surface, the first end region defining an end of the housing, the end cap being attached to the side wall portion at the second end region;
   an elastomeric cushion attached to the side wall portion and adjoining the inner surface, the cushion being at least partially spaced from the end cap to form an interior compartment; and
   a displaceable member affixed to the cushion and generally opposing the end cap, the member being adapted to move relative to the housing through cushion deformation.

2. The device of claim 1, wherein at least one of the side wall portion and the end cap defines a gripping structure that attaches the side wall portion to the end cap.

3. The device of claim 2, wherein the end cap defines a perimeter, and the gripping structure is included in the side wall portion and grips the perimeter.

4. The device of claim 1, wherein the member and the housing each include a threaded fastener.

5. The device of claim 1, wherein the side wall portion includes a region that is at least substantially cylindrical.

6. The device of claim 1, wherein the housing defines a central axis, the first end region of the side wall portion bending toward the central axis of the housing, in an at least partially spaced relation from the cushion, to form a cavity.

7. The device of claim 1, wherein the housing has a fastener with a head, the head opposing a central portion of the cushion.

8. The device of claim 1, the interior compartment formed by the cushion being a gas-phase compartment that extends from the cushion to the end cap.

9. A device for dampening vibrations, comprising:
   a housing having a side wall portion and an end cap, the side wall portion including opposing first and second end regions and having an inner surface, the end cap being attached to the side wall portion at the second end region;
   an elastomeric cushion attached to the side wall portion and adjoining the inner surface, the cushion being at least partially spaced from the end cap to define a gas-phase interior compartment extending from the cushion to the end cap; and
   a displaceable member affixed to the cushion and generally opposing the end cap, the member being adapted to move relative to the housing through cushion deformation.

10. The device of claim 9, wherein at least one of the side wall portion and the end cap defines a gripping structure that attaches the side wall portion to the end cap.

11. The device of claim 10, wherein the end cap defines a perimeter, the gripping structure being included in the side wall portion and gripping the perimeter.

12. The device of claim 9, wherein the housing defines a central axis, the first end region of the side wall portion bending toward the central axis of the housing, in an at least partially spaced relation from the cushion, to form a cavity.

13. The device of claim 9, wherein the housing has a housing fastener with a head, the head being spaced from the cushion by the gas-phase interior compartment.

14. The device of claim 9, wherein the housing is formed at least substantially of metal.

15. A method of fabricating a device for dampening vibrations, comprising:
    providing a displaceable member and further providing a side wall portion having opposing first and second end regions and an inner surface, the side wall portion being formed unitarily;
    attaching an elastomeric cushion to the side wall portion and adjoining the inner surface, the attached cushion being affixed to the displaceable member;

joining an end cap to the second end region to form a housing and an interior compartment, the end cap generally opposing the displaceable member in the housing; and modifying the shape of the side wall portion at the first end region after the step of attaching, the first end region defining an end of the housing opposing the end cap.

16. The method of claim 15, wherein the side wall portion is at least substantially cylindrical during the step of attaching.

17. The method of claim 15, wherein the step of attaching is carried out by molding the cushion at least substantially inside the side wall portion.

18. A device for dampening vibrations, comprising:

a housing having a side wall portion, an end cap, and an exterior shape, the side wall portion being one piece and discrete from the end cap, the side wall portion including an end region and an inner surface and partially defining the exterior shape, the end cap being attached to the side wall portion at the end region;

an elastomeric cushion attached to the side wall portion and adjoining the inner surface, the cushion being at least partially spaced from the end cap to form an interior compartment; and a displaceable member affixed to the cushion and generally opposing the end cap, the member being adapted to move relative to the housing through cushion deformation.

19. The device of claim 18, wherein at least one of the side wall portion and the end cap defines a gripping structure that attaches the side wall portion to the end cap.

20. The device of claim 19, wherein the end cap defines a perimeter, and the gripping structure is included in the sidewall portion and grips the perimeter.

21. The device of claim 18, wherein the member and the housing each include a threaded fastener.

22. The device of claim 18, wherein the side wall portion includes a region that is at least substantially cylindrical.

23. The device of claim 18, wherein the end region of the side wall portion is one of two opposing end regions, and wherein the housing defines a central axis, the other end region of the side wall portion bending toward the central axis of the housing, in an at least partially spaced relation from the cushion, to form a cavity.

24. A method of fabricating a device for dampening vibrations, comprising:

attaching an elastomeric cushion to a side wall portion, so that an inner surface of the side wall portion adjoins the cushion and a displaceable member is affixed to the elastomeric cushion and spaced from the side wall portion; and joining an end cap to the side wall portion and generally opposing the displaceable member to form a housing and create an interior compartment disposed between the cushion and the end cap, the housing having an exterior shape defined partially by the side wall portion.

25. The method of 24, wherein the step of attaching includes molding the elastomeric cushion using a mold defined partially by the side wall portion and the displaceable member.

26. The method of 24, wherein the step of joining includes forming a gripping structure on at least one of the side wall portion and the end cap, the gripping structure joining the side wall portion to the end cap.

* * * * *